United States Patent [19]

Weber

[11] Patent Number: 4,920,683
[45] Date of Patent: May 1, 1990

[54] FISHING BAIT AND LURE HOLDER

[76] Inventor: Jimmie L. Weber, 13915 Jaycreek Ct., Houston, Tex. 77070

[21] Appl. No.: 368,658

[22] Filed: Jun. 20, 1989

[51] Int. Cl.⁵ .............................................. A01K 87/00
[52] U.S. Cl. ..................................................... 43/25.2
[58] Field of Search ........................................ 43/25.2

[56] References Cited

U.S. PATENT DOCUMENTS

| 2,767,502 | 10/1956 | Reynolds | 43/25.2 |
| 4,216,604 | 8/1980 | Starke | 43/25.2 |
| 4,452,003 | 6/1984 | Deutsch et al. | 43/25.2 |

Primary Examiner—M. Jordan
Attorney, Agent, or Firm—Russell J. Egan

[57] ABSTRACT

A holder for protecting lures or bait attached to the line of fishing tackle is formed by like semi-cylindrical members having semi circular end walls each having recesses which define aligned holes in the closed condition of the holder. The holder is readily mounted on and removed from the tackle with the rod or pole thereof passing through the aligned holes and the bait or lure protected within the cylindrical cavity defined by said members. The holder is preferably integrally molded from at least semi-rigid plastics material.

6 Claims, 2 Drawing Sheets

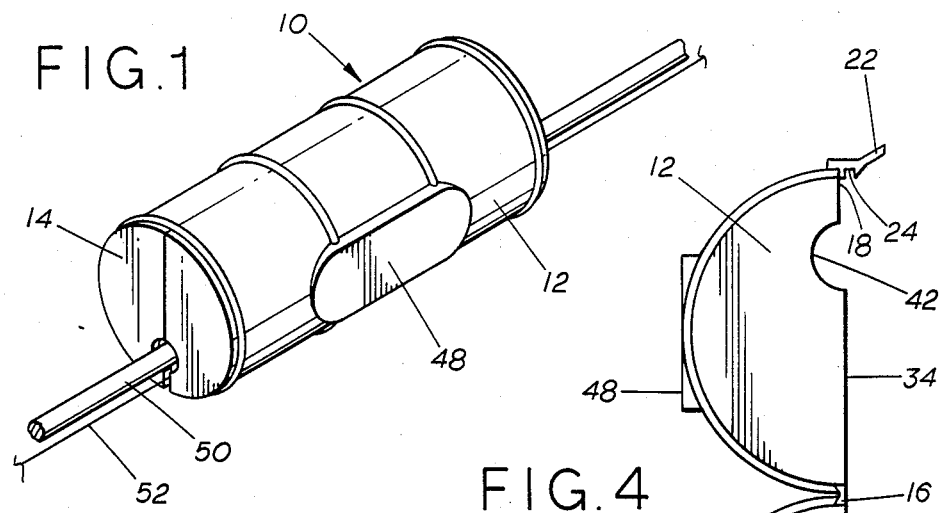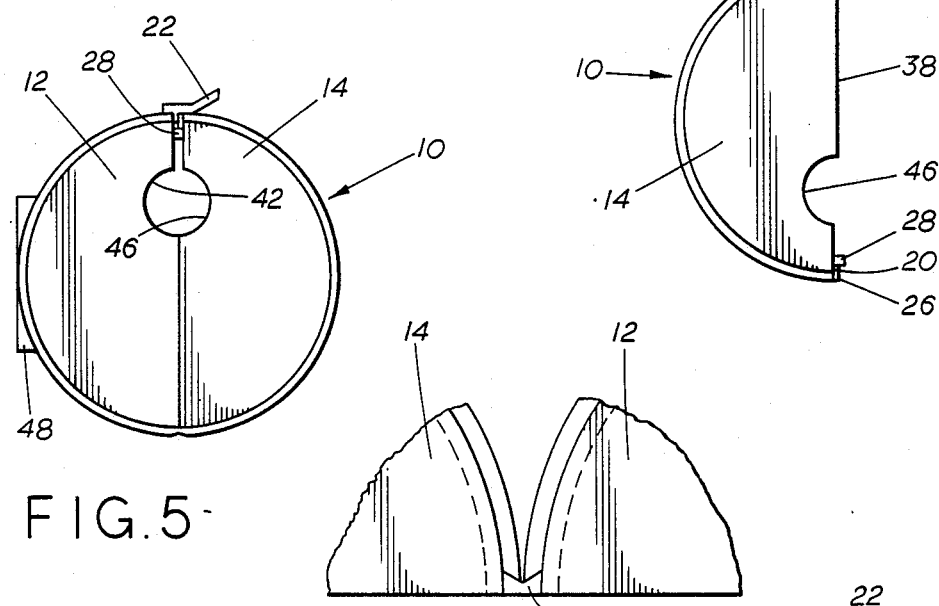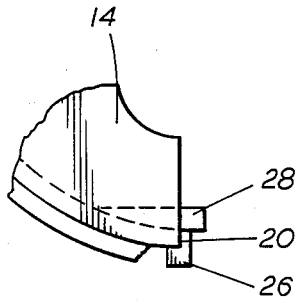

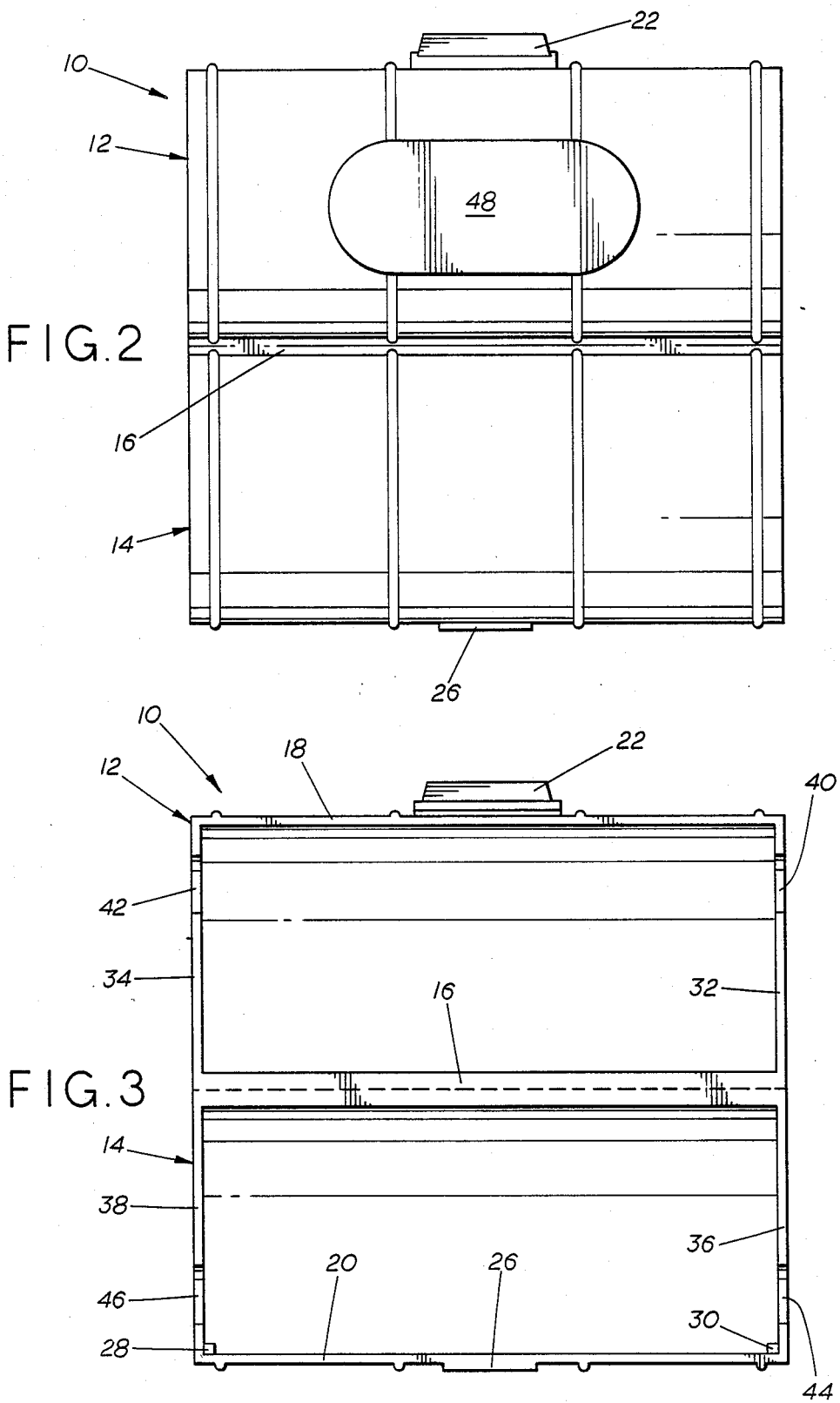

FISHING BAIT AND LURE HOLDER

BACKGROUND OF THE INVENTION

1. The Field of the Invention

The present invention concerns a bait or lure holder and in particular to a bait or lure holder which can be easily mounted on and removed from a fishing rod or pole to protect the bait or lure attached to the line while preventing it from becoming tangled with itself or surrounding gear and also keeping the bait or lure readily accessable.

2. Background of the Invention

The sport of fishing is a very old one and is engaged in by many people of all ages and walks of life. Over the years there have been many improvements in the types of tackle used so that it now ranges from simple hook-line-and-bobbers to expensive spin casting reels and rods of many types of materials and styles. However, all fishing tackle has the same problem and that is how to protect the bait or lure while not actually fishing, for example during storage of the tackle or transport to the fishing site. Any bait or lure fastened to the line can become tangled upon itself or with nearby equipment. There is also the ever present danger of the lure or bait being stepped upon or, even worse, becoming hooked to the fisherman or one of the party.

The traditional bait or lure holder has been a metal or plastics box which can be fastened on the fisherman's belt. While this may be satisfactory for some cases, it would not do for transporting or storing the fishing tackle. Also it certainly would not be suitable, for example, for a surf fisherman who might wade chest deep into the water while wearing water proof chest high waders or just a swim suit. These fishermen would need something which would protect both them and the bait or lure as they walk in the water. They would also want to keep the bait or lure out of the water and where they can get to it when they are ready to start fishing.

The present invention overcomes the above discussed problems by providing a bait or lure holder which can be attached to and dismounted from a fishing rod in such a manner as to protect the bait or lure attached to the fishing line while no fishing is in progress.

SUMMARY OF THE INVENTION

The present invention concerns a bait or lure holder adapted to protect bait or lures attached to a line of fishing tackle during storage and/or transportation of the tackle to prevent loss of or damage to or by the bait or lure. The subject invention comprises two semi cylindrical sections joined together along one elongated side by hinge means. The opposite elongated sides are provided with latching means to secure the holder in a closed condition. Both ends of each section have semi closed faces with like end faces defining aligned holes which enable the holder to be mounted on and about a fishing pole which passes through the holder. Integral stand offs space the surfaces of the latching side to allow for passage of and guidance of the fishing line. The subject invention may be made as a unitary member from known plastics materials.

BRIEF DESCRIPTION OF THE DRAWINGS

The present invention will now be described by way of example with reference to the accompanying drawings, in which:

FIG. 1 is a perspective view of the subject invention as it would be mounted on a fishing pole;

FIG. 2 is a top or outer plan view of the subject holder in an open condition;

FIG. 3 is a bottom or inner plan view of the subject holder in an open condition;

FIG. 4 is an end view of the holder in an open condition;

FIG. 5 is an end view of the subject holder in a closed condition;

FIG. 6 is a detail of the hinge portion of the subject invention;

FIG. 7 is a detail of the stand off; and

FIG. 8 is a detail of the latching portion.

DETAILED DESCRIPTION OF THE PREFERRED EMBODIMENT

The subject bait or lure holder 10 is preferably formed from a single piece of molded plastics material of know type. The holder has semi-cylindrical top 12 and bottom 14 portions joined along one elongated edge by hinge means 16. In this example the hinge means is integral with the top and bottom portions. The opposite elongated edges 18, 20, respectively, of top and bottom portions 12, 14 are provided with an integral latching member 22 having an inwardly directed recess 24 and with an outwardly directed lip 26. At least one of the edges is also provided with at least two spaced studs 28, 30, the purpose of which will be discussed later.

Each of the top and bottom portions 12, 14 is provided with integral semicircular end walls 32, 34, 36, 38 each of which has a semicircular opening 40, 42, 44, 46 therein. Together these openings define aligned openings in the closed condition of the holder. Preferably these aligned holes are off set from the elongated axis of the holder to allow more unrestricted room within the closed holder. One of the portions, in this case the top portion 12, can be provided with a flattened surface area 48 for a logo or owner identification.

The subject bait or lure holder 10 can be fastened on the fishing rod 50 by simply closing it around a portion of the rod with the rod passing through the openings 40, 42, 44, 46 in the end walls 32, 34, 36, 38. The studs 28, 30 will provide a slight standoff allowing the passage of the fishing line 52 through the holder. These studs also serve as guide means for the line. The bait or lure, not shown, would be enclosed in the holder.

The present invention is preferably molded from plastics material in unitary form. However, it is within the scope of the invention to have many alternative forms including multipart assembly with separate hinge means securing the top and bottom members together. The plastics material used to form the present invention is preferably a rigid or semi rigid material and may be opaque, translucent, or transparent. It also may be neutral, clear, or colored as desired.

The present invention may be subject to many changes and modifications without departing from the spirit or essential characteristics thereof. The present embodiment is therefor to be considered in all respects as illustrative and not restrictive of the scope of the invention.

I claim:

1. A readily attachable and removable bait or lure holder for fishing tackle, comprising:

first and second semi-cylindrical portions;

hinge mean joining said portions together along adjacent elongated sides;

latching means on opposite elongated sides of said portions adapted to secure said portions together to define a cylindrical cavity therein;

semicircular end walls integral with each end of each said portion, each said end wall having therein a semi-circular recess with recesses in like end walls together defining aligned holes in opposite ends of said holder, said aligned holes being offset from the elongated axis of said holder providing a greater unobstructed volume for said cavity, whereby said holder can be mounted on a fishing pole or rod to enclose and protect bait or lure attached to a fishing line during transport and/or storage of the fishing tackle.

2. The bait or lure holder according to claim 1 wherein said holder is formed at least semi-rigid plastics material.

3. The bait or lure holder according to claim 1 further comprising a flattened surface on at least one of said members adapted to receive identification thereon.

4. The bait or lure holder according to claim 1 wherein said hinge means are integral with said semicylindrical portions.

5. The bait or lure holder according to claim 1 further comprising stand off means on the elongated side of one of said portions opposite said hinge means whereby said portions are slightly spaced apart in the closed condition allowing for passage of fishing line through said holder.

6. The bait or lure holder according to claim 5 wherein said stand off means provide guidance through said holder for said fishing line.

* * * * *